(12) United States Patent
Yanakiev et al.

(10) Patent No.: US 8,534,050 B2
(45) Date of Patent: Sep. 17, 2013

(54) EXHAUST GAS AFTERTREATMENT SYSTEM FOR A DIESEL ENGINE AND METHOD OF INCREASING A TEMPERATURE OF AN SCR CATALYST TO REDUCE $NO_x$ IN EXHAUST GASES

(75) Inventors: Ognyan N. Yanakiev, Canton, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

(21) Appl. No.: 12/641,809

(22) Filed: Dec. 18, 2009

(65) Prior Publication Data

US 2011/0146243 A1 Jun. 23, 2011

(51) Int. Cl.
*F01N 3/00* (2006.01)
(52) U.S. Cl.
USPC .................... 60/286; 60/284; 60/285; 60/299
(58) Field of Classification Search
USPC ............................. 60/274, 285–287, 295–301
See application file for complete search history.

(56) References Cited

U.S. PATENT DOCUMENTS

| | | | | |
|---|---|---|---|---|
| 5,480,854 | A * | 1/1996 | Rajaram et al. | 502/304 |
| 5,974,792 | A * | 11/1999 | Isobe | 60/278 |
| 6,477,831 | B1 * | 11/2002 | Ballinger et al. | 60/284 |
| 6,666,020 | B2 * | 12/2003 | Tonetti et al. | 60/286 |
| 6,928,806 | B2 * | 8/2005 | Tennison et al. | 60/286 |
| 7,204,227 | B2 | 4/2007 | Leone et al. | |
| 7,421,838 | B2 | 9/2008 | Nakano | |
| 8,176,729 | B2 * | 5/2012 | Ren | 60/286 |
| 2003/0167756 | A1 * | 9/2003 | Szymkowicz | 60/289 |
| 2006/0156709 | A1 * | 7/2006 | Twigg et al. | 60/278 |
| 2006/0162317 | A1 * | 7/2006 | Twigg et al. | 60/278 |
| 2007/0289295 | A1 * | 12/2007 | Miyashita | 60/300 |
| 2008/0104945 | A1 * | 5/2008 | Ruth et al. | 60/286 |
| 2009/0056314 | A1 * | 3/2009 | Gabe et al. | 60/278 |
| 2009/0223207 | A1 | 9/2009 | Ren | |

FOREIGN PATENT DOCUMENTS

| | | |
|---|---|---|
| CN | 1682018 A | 10/2005 |
| CN | 1891987 A | 1/2007 |
| CN | 101524623 A | 9/2009 |

OTHER PUBLICATIONS

U.S. Appl. No. 12/400,156, filed Mar. 9, 2009 entitled Ammonia (NH3) Storage Control System and Method Based on a Nitrogen Oxide (NOx) Sensor.

* cited by examiner

*Primary Examiner* — Thomas Denion
*Assistant Examiner* — Jesse Bogue
(74) *Attorney, Agent, or Firm* — Cantor Colburn LLP (57) ABSTRACT

An exhaust gas aftertreatment system for a diesel engine is provided. The system includes a controller operably coupled to the engine that induces the engine to combust a rich air/fuel mixture in at least one cylinder at a predetermined time interval after startup of the engine to output exhaust gases including elevated levels of CO, and a percentage increase in HC that is less than a minimal threshold percentage relative to combusting a lean air/fuel mixture. The system further includes a diesel oxidation catalyst that receives the exhaust gases and oxidizes the CO to obtain an exothermic reaction that increases a temperature of the exhaust gases flowing through the oxidation catalyst to greater than a threshold temperature level. The system further includes an SCR catalyst which receives the exhaust gases and reduces $NO_x$ in the exhaust gases.

20 Claims, 6 Drawing Sheets

EXHAUST GAS AFTERTREATMENT SYSTEM FOR A DIESEL ENGINE AND METHOD OF INCREASING A TEMPERATURE OF AN SCR CATALYST TO REDUCE NO$_x$ IN EXHAUST GASES

FIELD OF THE INVENTION

Exemplary embodiments of the present invention are related to an exhaust gas aftertreatment system and, more specifically, to an exhaust gas aftertreatment system for a diesel engine and a method of increasing a temperature of a Selective Catalytic Reduction (SCR) catalyst during engine startup to reduce nitrous oxides (NO$_x$) in exhaust gases of the diesel engine.

BACKGROUND

Diesel engines offer a benefit of increased fuel economy. However control of NO$_x$ emissions in such systems is complicated due to a high content of oxygen in the exhaust gases. Further, during a cold start of the diesel engine, a catalyst downstream of the diesel engine has a relatively low efficiency in reducing NO$_x$ since it does not reach a desired operational temperature level relatively quickly.

Accordingly, it is desirable to provide an improved exhaust gas aftertreatment system and a method for increasing a temperature of an SCR catalyst during engine startup to reduce NO$_x$ in exhaust gases from the diesel engine.

SUMMARY OF THE INVENTION

In one exemplary embodiment of the present invention, an exhaust gas aftertreatment system for a diesel engine is provided. The system includes a controller operably coupled to the diesel engine. The controller is configured to induce the diesel engine to combust a rich air/fuel mixture in at least one cylinder within a predetermined time interval after startup of the diesel engine to output exhaust gases including elevated levels of carbon-monoxide (CO), and a percentage increase in hydrocarbons (HC) that is less than a minimal threshold percentage relative to combusting a lean air/fuel mixture. The system further includes a diesel oxidation catalyst (DOC) coupled downstream of the diesel engine. The DOC receives the exhaust gases from the diesel engine and oxidizes the CO to obtain an exothermic reaction that increases a temperature of the exhaust gases flowing through the DOC to greater than a threshold temperature level. The system further includes an SCR catalyst coupled downstream of the DOC. The SCR catalyst receives the exhaust gases greater than the threshold temperature level and reduces NO$_x$ in the exhaust gases.

In another exemplary embodiment of the present invention, a method for increasing a temperature of an SCR catalyst to reduce NO$_x$ in exhaust gases from a diesel engine utilizing an exhaust gas aftertreatment system is provided. The system has a controller, a DOC, and the SCR catalyst. The DOC is coupled downstream of the diesel engine. The SCR catalyst is coupled downstream of the DOC. The method includes generating at least one control signal to induce the diesel engine to combust a rich air/fuel mixture in at least one cylinder within a predetermined time interval after startup of the diesel engine to output exhaust gases including elevated levels of CO, and a percentage increase in HC that is less than a minimal threshold percentage relative to combusting a lean air/fuel mixture. The method further includes receiving the exhaust gases from the diesel engine in the DOC and oxidizing the CO to obtain an exothermic reaction in the DOC which increases a temperature of the exhaust gases flowing through the DOC to greater than a threshold temperature level. The method further includes receiving the exhaust gases greater than the threshold temperature level in the SCR catalyst and reducing NO$_x$ in the exhaust gases utilizing the SCR catalyst.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, application or uses. It should be understood that throughout the drawings, corresponding reference numerals indicate like or corresponding parts and features.

Figure 1:
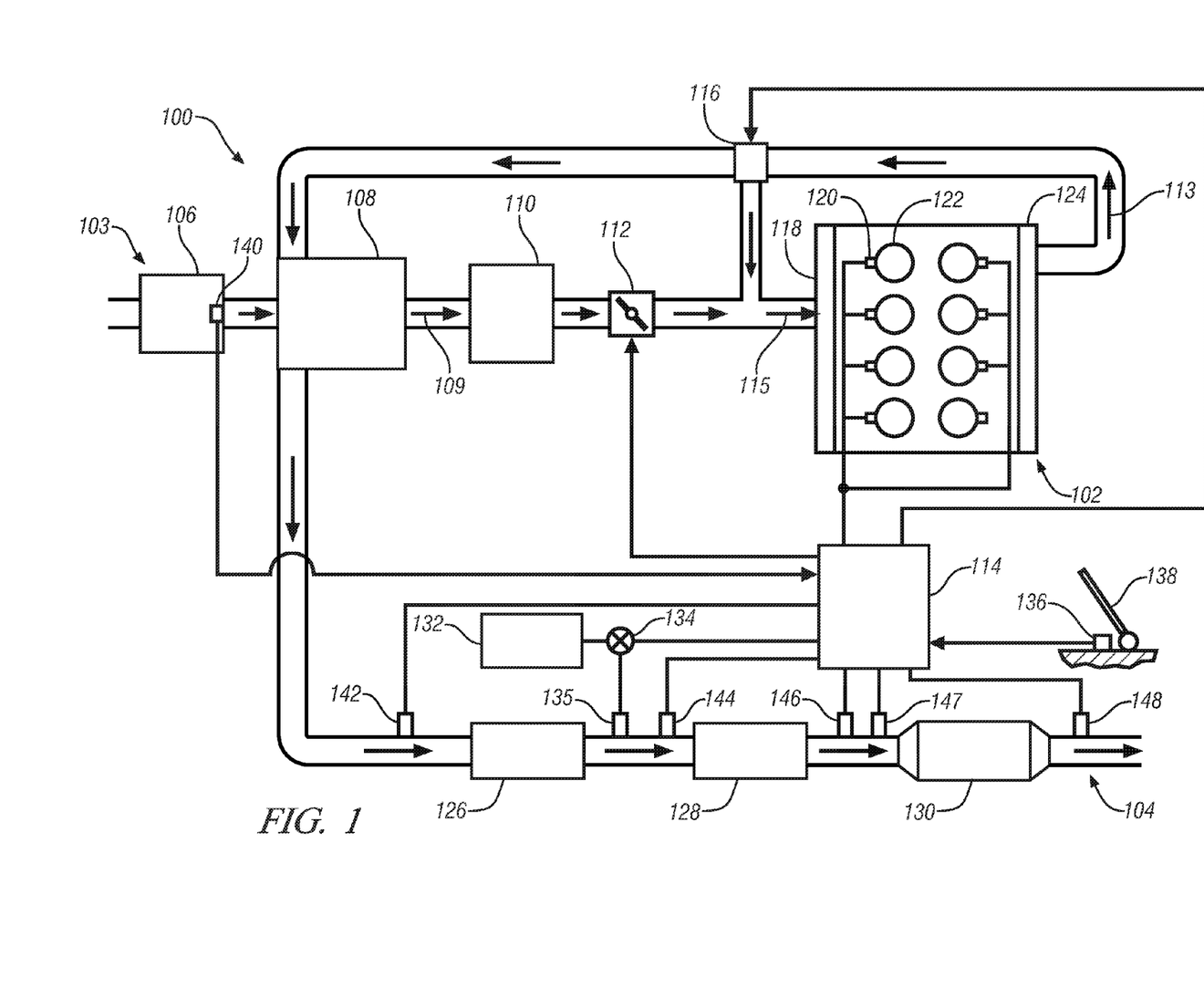
FIG. 1 is a schematic of a vehicle having a diesel engine and an exhaust gas aftertreatment system in accordance with an exemplary embodiment.

In accordance with an exemplary embodiment of the present invention, referring to FIG. 1, a schematic of a vehicle 100 is illustrated. The vehicle 100 includes a diesel engine 102, an intake system 103, and an exhaust gas aftertreatment system 104. The engine 102 combusts a mixture of air and diesel fuel to produce drive torque and releases exhaust gases into the exhaust gas aftertreatment system 104. The exhaust gas aftertreatment system 104 treats exhaust gases to reduce emissions released to the atmosphere. In an exemplary embodiment, the engine 102 combusts a rich air/fuel mixture in a predetermined combustion sequence and outputs exhaust gases having elevated levels of CO with a minimal increase in HC. Unlike HC, the CO has a relatively low oxidation temperature and generates an exothermic reaction in a DOC at the low oxidation temperature to quickly bring an SCR catalyst up to a desired operating temperature after engine startup. As a result, after startup of the diesel engine, the SCR catalyst can quickly and effectively reduce NO$_x$ in exhaust gases from the diesel engine.

Air 109 may enter the diesel engine 102 through an air intake system 103 that may include an air filter 106, a turbocharger 108, an air cooler 110, and an intake throttle valve (ITV) 112. In particular, the air 109 may enter the diesel engine 102 through an air filter 106 and continue through an intake side of a turbocharger 108. The turbocharger 108 compresses the air 109 using a turbine (not shown) that is powered by exhaust gases 113 from the diesel engine 102. The compressed air 109 may pass through an air cooler 110 or other conditioners before passing through the ITV 112.

A controller 114 may position the ITV 112 at various angles to adjust the mass flow rate of the compressed air 109. A portion of the exhaust gases 113 may be recirculated to the intake system 103 via an exhaust gas recirculation (EGR) valve 116 to form an air mixture 115 that enters an intake manifold 118. The controller 114 controls the position of the EGR valve 116 to adjust the amount of recirculated exhaust gases 113. In one exemplary embodiment, the controller 114 includes a microprocessor communicating with computer readable storage media. The computer readable storage media include nonvolatile and volatile storage in a read-only memory (ROM) and a random access memory (RAM). The computer readable media may be implemented using any of a number of known memory devices such as PROMs, EPROMS, EEPROMS, flash memory or any other memory device capable of storing data, some of which represent executable instructions, used by the microprocessor.

The air mixture 115 from the intake manifold 118 is combined with fuel from fuel injectors 120 in cylinders 122 and the resulting air-fuel mixture is combusted to produce torque. Although FIG. 1 depicts eight cylinders, the diesel engine 102 may include an additional number or a fewer number of cylinders 122. The exhaust gases 113 exit the cylinders 122 through an exhaust manifold 124 and pass through the turbocharger 108 to the exhaust gas aftertreatment system 104.

The controller 114 communicates with an accelerator pedal sensor 136 and a mass airflow (MAF) sensor 140. The accelerator pedal sensor 136 generates a signal indicating a position of an accelerator pedal 138. The MAF sensor 140 generates a signal indicating a mass of the air 109 entering the turbocharger 108. The controller 114 may use the pedal position signal and the MAF signal to control the ITV 112, the EGR valve 116, and the fuel injectors 120.

The exhaust gas aftertreatment system 104 is configured to implement a method for increasing a temperature of the SCR catalyst 128 to reduce $NO_x$ in the exhaust gases 113 from the diesel engine 102. The exhaust gas aftertreatment system 104 may include a DOC 126, an SCR catalyst 128, a particulate filter 130, an upstream $NO_x$ sensor 142, a temperature sensor 144, a downstream $NO_x$ sensor 146, temperature sensors 147, 148, and the controller 114.

The DOC 126 is fluidly coupled between the exhaust manifold 124 and the SCR catalyst 128. The DOC 126 is utilized to receive the high CO content exhaust gases 113 from one or more of the cylinders of the diesel engine 120 and to combust the CO therein to generate an exothermic reaction to increase a temperature of exhaust gases passing through the DOC 126. Exhaust gases from the DOC 126 flow into the SCR catalyst 128.

The SCR catalyst 128 is coupled between the DOC 126 and the particulate filter 130. The SCR catalyst 128 is provided to reduce $NO_x$ in the received exhaust gases when a temperature of the received exhaust gases is greater than approximately 200° Celsius.

The particulate filter 130 is coupled downstream of the SCR catalyst 128. The particulate filter 130 is provided to remove particulate matter in received exhaust gases therein. The exhaust gases 113 flow through the particulate filter 130 and exit the filter into the atmosphere.

The upstream $NO_x$ sensor 142 detects an upstream $NO_x$ concentration level (i.e., $NO_x$ concentration level upstream from the SCR catalyst 128) and generates a signal indicating the upstream $NO_x$ concentration level that is received by the controller 114. The temperature sensor 144 detects a temperature level of exhaust gases 113 upstream from the SCR catalyst 128 and generates a signal indicating the temperature level that is received by the controller 114. The downstream $NO_x$ sensor 146 detects a downstream $NO_x$ concentration level (i.e., $NO_x$ concentration level downstream from the SCR catalyst 128) and generates a signal indicating the downstream $NO_x$ concentration level that is received by the controller 114. The temperature sensor 147 detects a temperature level of exhaust gases downstream from the SCR catalyst 128 and generates a signal indicating the temperature level that is received by the controller 114. Further, the temperature sensor 148 detects a temperature level of exhaust gases downstream from the particulate filter 130 and generates a signal indicating the temperature level that is received by the controller 114.

A dosing system 132 may inject a dosing agent (e.g., urea) into the exhaust gases downstream of the DOC 126. The controller 114 regulates the amount of dosing agent injected through a nozzle 135 via a dosing valve 134. The dosing agent breaks down to form ammonia ($NH_3$) that is stored in the SCR catalyst 128. $NH_3$ stored in the SCR catalyst 128 reacts with $NO_x$ in the exhaust to form nitrogen ($N_2$) and water ($H_2O$), which reduces $NO_x$. As indicated, this reaction typically occurs at temperatures above approximately 200° C.

Figure 2:
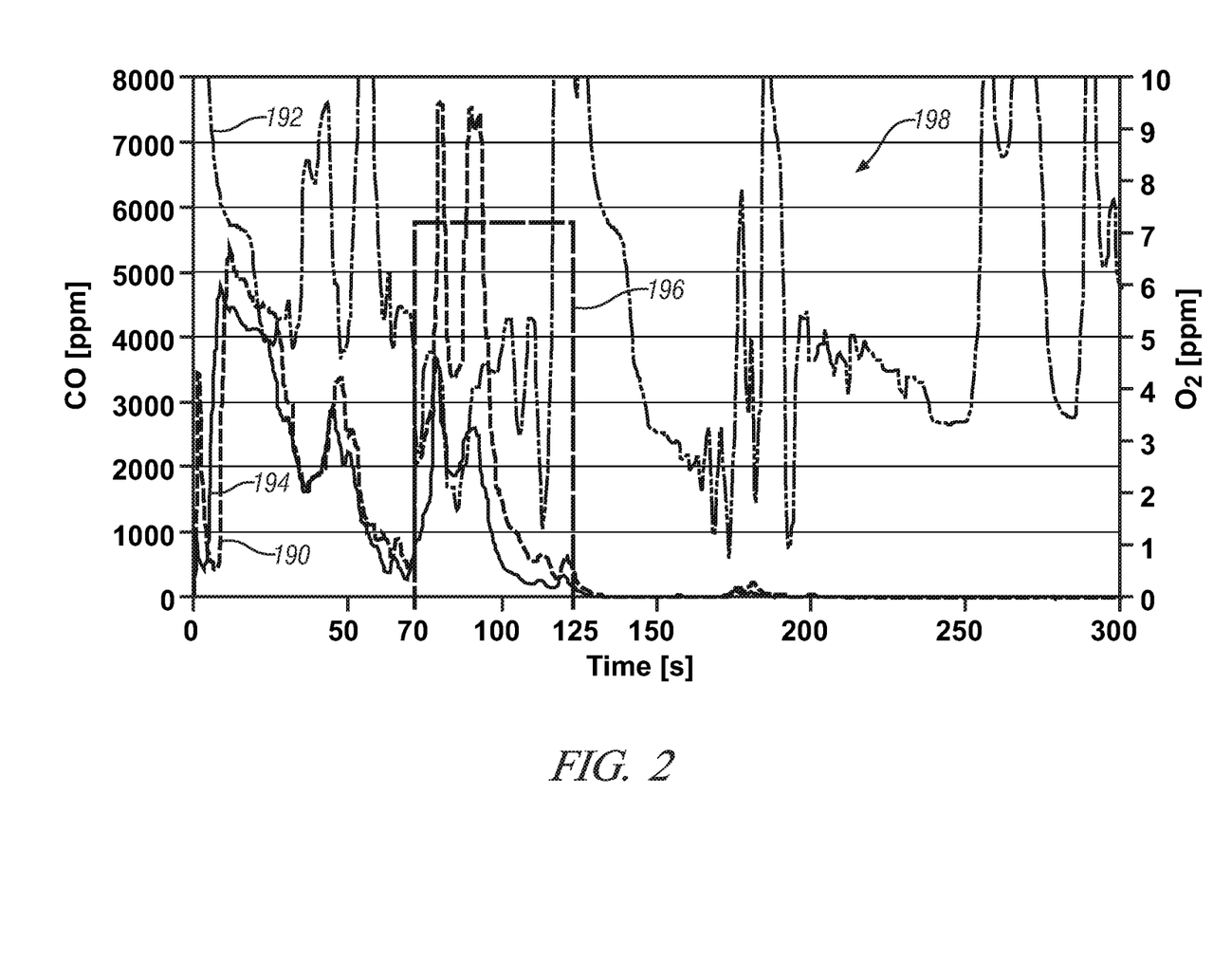
FIG. 2 is a graph having an engine output CO concentration curve, an engine output O$_2$ concentration curve, a DOC output CO concentration curve, and a rich air/fuel combustion curve.
Figure 3:
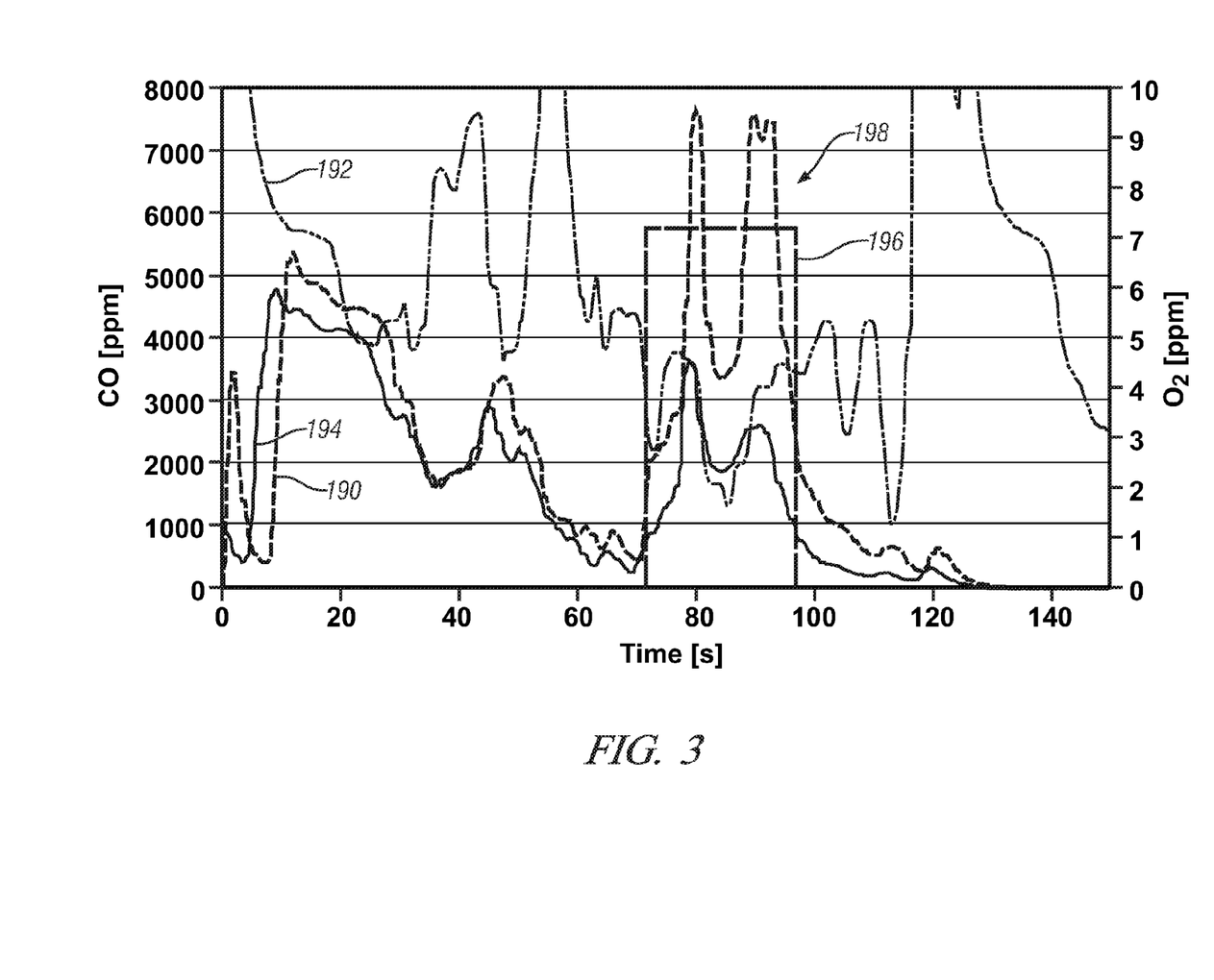
FIG. 3 is a graph of the engine output CO concentration curve of FIG. 2 illustrating only a portion of the graph timeline.

Referring to FIGS. 2, 3, 4 and 5, a brief overview of an operation of the exhaust gas aftertreatment system 104 will now be provided. FIGS. 2 and 3 illustrate a graph 198 having an engine output CO concentration curve 190 indicating a concentration of CO in exhaust gases 113 output from the diesel engine 102 after engine startup over time. The graph 198 further includes an engine output $O_2$ concentration curve 192 indicating a concentration of $O_2$ in exhaust gases 113 output from the diesel engine 102 over time. The graph 198 further includes a DOC output CO concentration curve 194 indicating a concentration of CO in exhaust gases 113 output from the DOC 126 over time. The graph 198 further includes an air/fuel combustion curve 196 indicating when a predetermined rich air/fuel injection sequence occurs in four of the cylinders in the diesel engine 102. Of course, a rich air/fuel combustion could be implemented in more than four cylinders or less than four cylinders. In one exemplary embodiment, a Lambda value in a range of 0.95-0.97 was utilized in four of the cylinders of the diesel engine 102 during combustion of the rich air/fuel ratio. Lambda (λ) is a ratio of an actual air/fuel ratio to stoichiometry for a given air/fuel mixture. Lambda of 1.0 is at stoichiometry, rich air/fuel mixtures are less than 1.0, and lean air/fuel mixtures are greater than 1.0.

Figure 7:
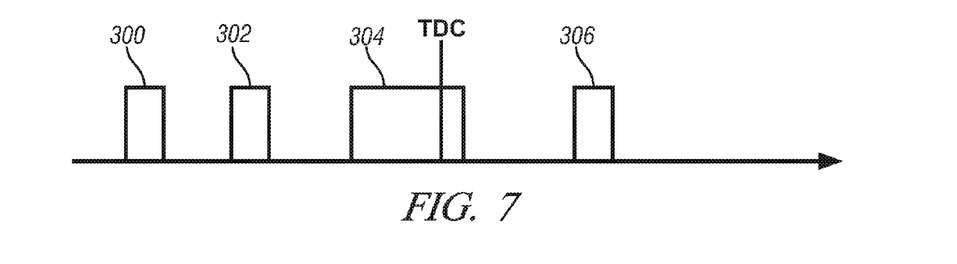
FIG. 7 is a schematic of an exemplary fuel pulse sequence utilized in the diesel engine of FIG. 1.

Further, referring to FIG. 7, a schematic illustrates an exemplary fuel pulse sequence that may be utilized in one of more cylinders 122 of the diesel engine 100 to output $NO_x$, CO, and HC, such that the percentage increase in the HC is less than a minimal threshold percentage relative to a lean air/fuel mixture, while combusting a rich air/fuel mixture. In particular, the controller 114 generates first and second control signals to induce a fuel injector 120 to inject two pilot fueling pulses 300, 302 into one or more cylinders 122. Thereafter, the controller 114 generates a third control signal to induce the fuel injector 120 to inject a primary fueling pulse 304 in one or more cylinders 122 when a crankshaft of the engine 100 is at top dead center (TDC). Thereafter, the controller 114 generates a fourth control signal to induce the fuel injector 120 to inject a post fueling pulse 306 into the one or more cylinders 122 of the engine 100. Of course, other fuel pulse strategies or sequences are contemplated herein.

Figure 4:
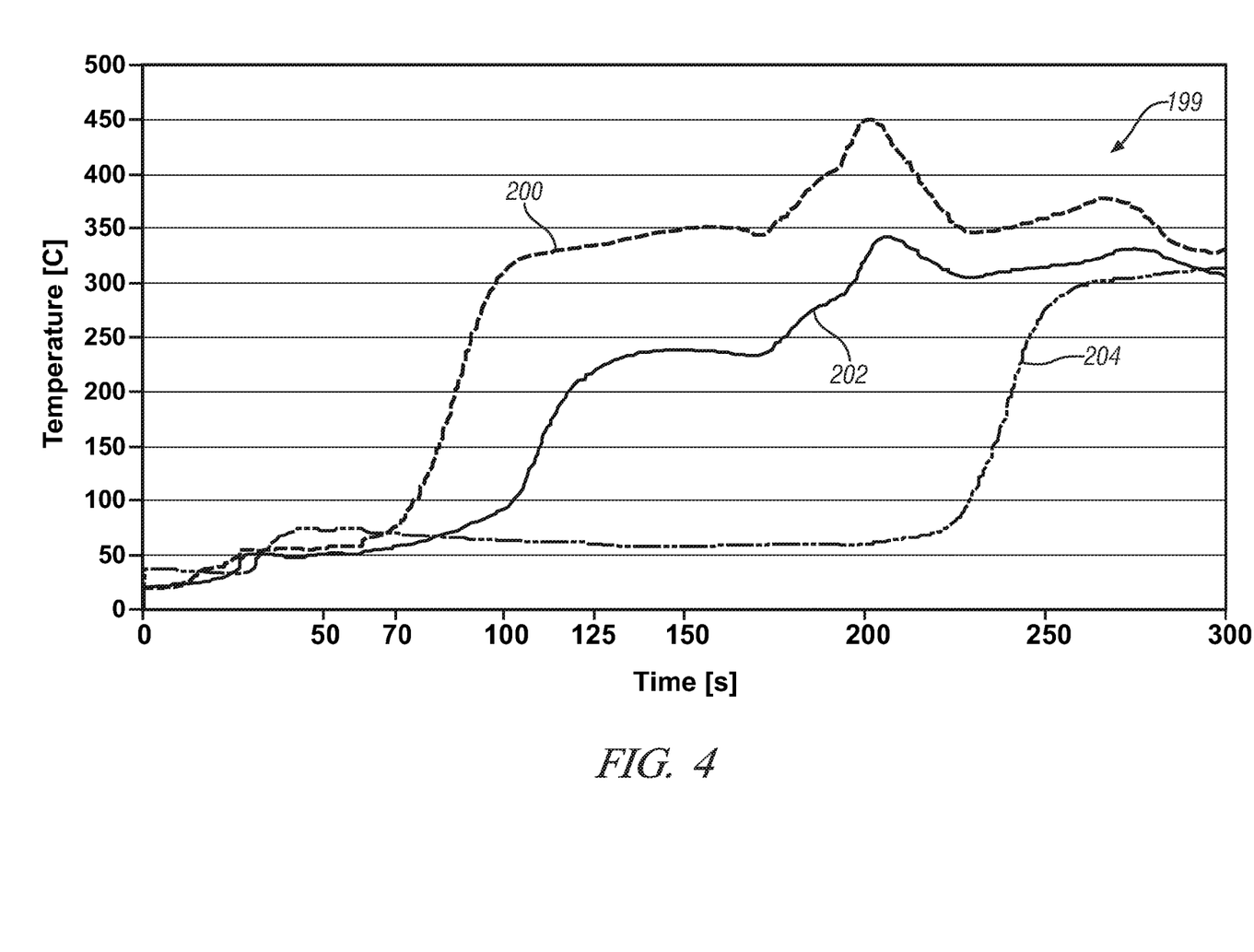
FIG. 4 is a graph having a DOC output temperature curve, an SCR catalyst input temperature curve, and an SCR catalyst output temperature curve.

FIG. 4 illustrates a graph 199 having a DOC output temperature curve 200 indicating a temperature of exhaust gases exiting the DOC 126 after engine startup over time. The graph 199 further includes an SCR catalyst input temperature curve 202 indicating a temperature of exhaust gases entering the SCR catalyst 128 over time. The graph 199 further includes an SCR catalyst output temperature curve 204 indicating a temperature of exhaust gases exiting the SCR catalyst 128 over time.

Figure 5:
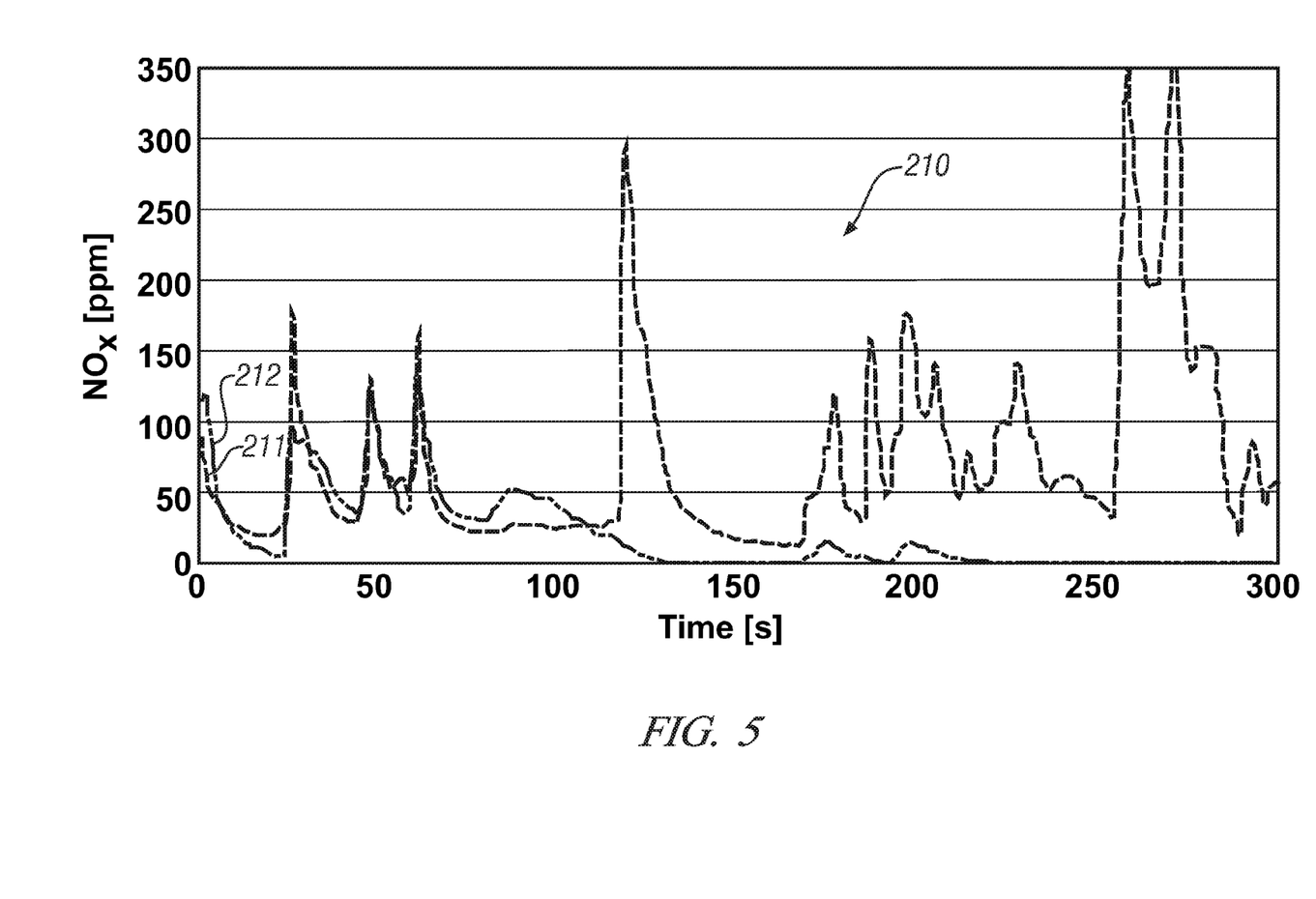
FIG. 5 is a graph having an engine output NO$_x$ concentration curve and an SCR output NO$_x$ concentration curve.

FIG. 5 illustrates a graph 210 having an engine output $NO_x$ concentration curve 211 indicating a $NO_x$ concentration of exhaust gases 113 exiting the engine 102 after engine startup over time. The graph 210 further includes an SCR catalyst output NOx concentration curve 212 indicating a $NO_x$ concentration of exhaust gases exiting the SCR catalyst 128 over time.

Referring to FIGS. 2, 3, 4 and 5, a specific example is shown of an eight cylinder diesel engine utilizing an inventive method. During a time interval from 0-70 seconds after engine start up, the diesel engine 102 is operated with eight cylinders combusting a lean air/fuel mixture.

During a time interval from 70-125 seconds, the diesel engine 102 is operated with four of the cylinders running the predetermined rich air/fuel injection sequence in accordance with an exemplary embodiment. During this time interval, the rich combustion curve 196 indicates a rich air/fuel mixture is being delivered and combusted in four cylinders of the engine 102. Further, during this time interval the engine output $O_2$ concentration curve 192 indicates the oxygen concentration in the exhaust gases 113 from the engine 102 drops from 6% to 2%. Further, the engine output CO concentration curve 190 indicates the CO concentration in exhaust gases 113 exiting the engine 102 increases from 700 ppm to as high as 7700 ppm. Further, the DOC output CO concentration curve 194 indicates the CO concentration in exhaust gases exiting the DOC 126 increases from approximately 700 ppm to 3600 ppm. The difference between the curves 194 and 190 corresponds to a combusted amount of CO in the DOC 126. Further, the DOC output temperature curve 200 indicates a temperature level of exhaust gases exiting the DOC 126 increases from 75° C. to 340° C. as a result of an exothermic reaction being generated due to excess CO being oxidized in the DOC 126. Further, the SCR catalyst input temperature curve 202 indicates a temperature level of exhaust gas entering the SCR catalyst 128 increases from 60° C. to 200° C.; the temperature at which reduction of $NO_x$ in the SCR catalyst 128 can occur. Further, the SCR catalyst output temperature curve 204 indicates a temperature level of exhaust gases exiting the SCR catalyst 128 decreases slightly. Still further, the engine output $NO_x$ concentration curve 211 indicates a $NO_x$ concentration level of exhaust gases 113 exiting the engine 102 increases from 30 ppm to 298 ppm. Still further, the SCR output $NO_x$ concentration curve 212 indicates a $NO_x$ concentration level of exhaust gases exiting the SCR catalyst 128 decreases from 40 ppm to 10 ppm indicating SCR catalyst activity.

It should be noted that during the time interval 70-125 seconds, the diesel engine 102 is operated with four of the cylinders running the predetermined rich air/fuel injection sequence which results in a temperature of exhaust gases exiting the SCR catalyst 128 to exceed 200° C. at approximately 240 seconds after engine start up. As a result, the SCR catalyst temperature is rapidly raised to a desired operational temperature which allows the SCR catalyst 128 to reduce $NO_x$ in received exhaust gases.

During a time interval from 125-300 seconds after engine start up, the diesel engine 102 is operated with eight cylinders combusting a lean air/fuel mixture corresponding to a normal diesel air/fuel mixture.

Figure 6:
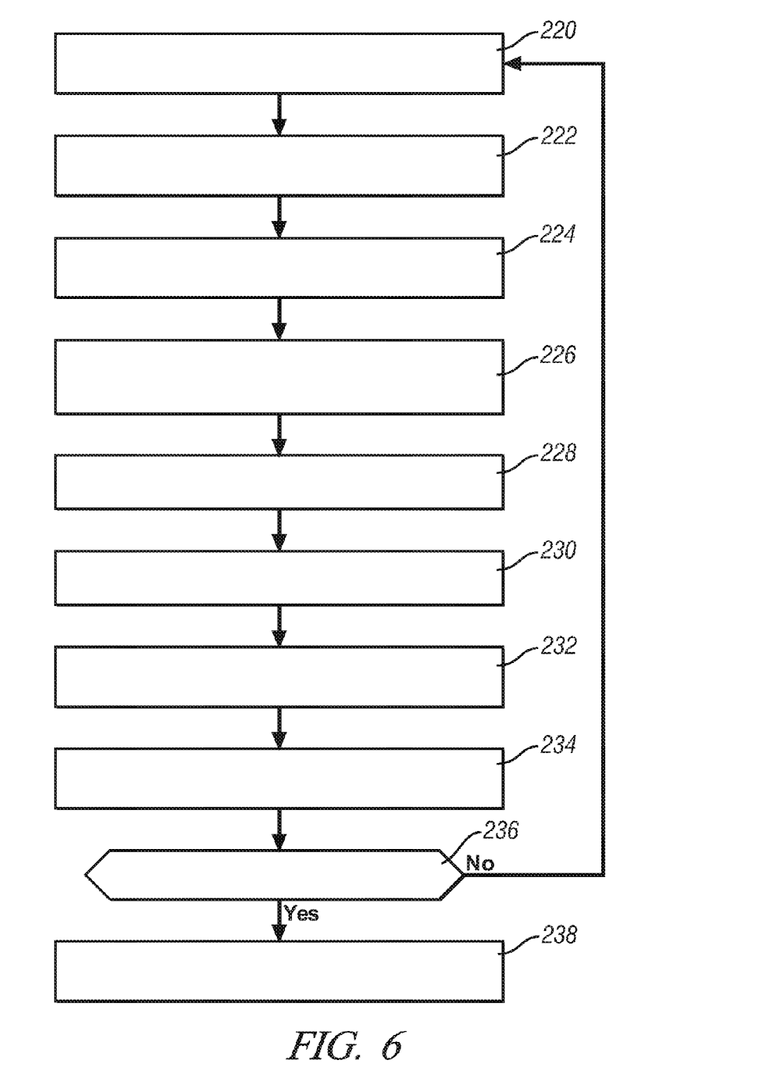
FIG. 6 is a flowchart of a method for increasing a temperature of an SCR catalyst to reduce NO$_x$ in exhaust gases from the diesel engine of FIG. 1, in accordance with another exemplary embodiment.

Referring to FIG. 6, a flowchart of a method for rapidly increasing a temperature of the SCR catalyst 128 to reduce $NO_x$ in exhaust gases from the diesel engine 102 in accordance with another exemplary embodiment will now be explained. In one exemplary embodiment, the foregoing method is performed in the time interval 70-125 seconds after engine startup. Of course, it could be performed at other times after engine startup, such as 70-95 seconds after engine startup for example. In one exemplary embodiment, the controller 114 can determine when to implement the following method to initiate the predetermined rich injection sequence in at least one of the engine cylinders 122 based on a temperature level of exhaust gases 113 entering the DOC 126 or a temperature of exhaust gases exiting the DOC 126. For example, if a temperature level of exhaust gases 113 entering the DOC 126 is greater than 70° C. (or alternatively 80° C.), then the controller 114 can determine to initiate the rich injection sequence in at least one of the engine cylinders 122. In this embodiment, an additional temperature sensor would be disposed upstream of the DOC 126 and operably coupled to the controller 114. Alternatively, for example, if a temperature level of exhaust gases exiting the DOC 126 is greater than 70° C. (or alternatively 80° C.), then the controller 114 can determine to initiate the rich combustion in at least one of the engine cylinders 122. It should be noted that a temperature level of exhaust gases entering or exiting the DOC 126 that are greater than 70° C. allows the DOC 126 to effectively oxidize CO.

At step 220, the controller 114 calculates a total diesel fuel amount for cylinders of the diesel engine 102 based on a desired mass air/fuel amount, a desired total air/fuel ratio, and a measured air/fuel ratio output by the diesel engine 102, utilizing the following equation: total diesel fuel amount=f1 (desired mass air/fuel amount, desired total air/fuel ratio, measured air/fuel ratio), wherein f1 corresponds to a mathematical function.

At step 222, the controller 134 calculates a fuel amount to obtain a rich air/fuel mixture in at least one cylinder of the diesel engine 102 based on the total diesel fuel amount, utilizing the following equation: fuel amount=f2(total diesel fuel amount, number of cylinders), wherein f2 corresponds to a mathematical function.

At step 224, the controller 134 induces the diesel engine 102 to inject the predetermined fuel sequence to combust the rich air/fuel mixture in at least one cylinder after startup of the diesel engine 102 to output exhaust gases 113 including increased CO levels, and a percentage increase in HC less than a minimal threshold percentage relative to combusting a lean air/fuel mixture. In one exemplary embodiment, during step 224, a percentage increase in HC is less than 1% relative to combustion of a lean air/fuel mixture with a Lambda value in a range of 1.25-3.0.

At step 226, the DOC 126 receives the exhaust gases 113 from the diesel engine 102 and oxidizes the increased levels of CO to obtain an exothermic reaction that increases a temperature of the exhaust gases flowing through the DOC 126 to greater than a threshold temperature level. In one exemplary embodiment, the threshold temperature level is 300° C. Of course, the threshold temperature level could be less than 300° C., such as a temperature level in a range of 180-299° C. for example.

At step 228, the SCR catalyst 128 receives the thermally elevated exhaust gases from the DOC 126 and reduces $NO_x$ in the exhaust gases.

At step 230, the particulate filter 140 coupled downstream of the SCR catalyst 128 captures particulate matter in the exhaust gases. At step 232, the temperature sensor 144 generates a first temperature signal T1 indicative of a temperature level of the exhaust gases exiting the DOC 126.

At step 234, the temperature sensor 147 generates a second temperature signal T2 indicative of a temperature level of the exhaust gases exiting the SCR catalyst 128.

At step 236, the controller 134 makes a determination as to whether ((T1*F1)+(T2*F2))>threshold temperature value T3 wherein F1 is a predetermined constant value and F2 is a predetermined constant value, and wherein F1+F2=1. If the value of step 236 equals "yes", the method advances to step 238. Otherwise, the method returns to step 220.

At step 238, the controller 134 induces the diesel engine 102 to stop injecting and combusting the rich air/fuel mixture in the at least one cylinder of the diesel engine 102. After step 238, the method is exited.

The exhaust gas aftertreatment system 104 and the method for increasing a temperature of the SCR catalyst 128 provide a substantial advantage over other systems and methods. In particular, the system 104 and the method provide a technical effect of combusting a rich air/fuel mixture in a diesel engine and outputting exhaust gases having increased levels of CO with a minimal increase in HC. The CO has a relatively low oxidation temperature relative to HC (e.g., 70° C. versus 200° C.) and generates an exothermic reaction in a DOC at the low oxidation temperature to quickly bring an SCR catalyst up to a desired operating temperature after engine startup. As a result, after startup of the diesel engine, the SCR catalyst can quickly and effectively reduce $NO_x$ in exhaust gases from the diesel engine.

The above-described method can be at least partially embodied in the form of one or more computer readable media having computer-executable instructions for practicing the method. The computer-readable media can comprise one or more of the following: floppy diskettes, CD-ROMs, hard drives, flash memory, and other computer-readable media known to those skilled in the art; wherein, when the computer-executable instructions are loaded into and executed by one or more computers, the one or more computers become an apparatus for practicing the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas aftertreatment system for a diesel engine, comprising:
   a controller operably coupled to the diesel engine, the controller configured to induce the diesel engine to combust a lean air/fuel mixture during a first time interval so as to produce an output exhaust gas flow comprising a first concentration of a hydrocarbon (HC) and carbon monoxide (CO), and to combust a rich air/fuel mixture in at least one cylinder during a second time interval after the first time interval such that the output exhaust gas flow comprises a concentration of HC that is less than approximately about 1% greater than the first concentration of HC;
   a diesel oxidation catalyst coupled downstream of the diesel engine, the diesel oxidation catalyst receiving the exhaust gases from the diesel engine and oxidizing CO to obtain an exothermic reaction which increases a temperature of the exhaust gases flowing through the diesel oxidation catalyst to greater than a threshold temperature level; and
   an SCR catalyst coupled downstream of the diesel oxidation catalyst, the SCR catalyst receiving the exhaust gases greater than the threshold temperature level and reducing $NO_x$ in the exhaust gases,
   wherein the controller is also configured to induce the diesel engine to combust the lean air/fuel mixture during a third time interval following the second time interval.

2. The exhaust gas aftertreatment system of claim 1, wherein the rich air/fuel mixture is obtained in the at least one cylinder by injecting two pilot fueling pulses into the at least one cylinder, then injecting a primary fueling pulse into the at least one cylinder when an engine crankshaft is at a top dead center position, and then injecting a post fueling pulse into the at least one cylinder.

3. The exhaust gas aftertreatment system of claim 1, wherein the threshold temperature level is 300° C.

4. The exhaust gas aftertreatment system of claim 1, further comprising:
   a first temperature sensor disposed between the oxidization catalyst and the SCR catalyst generating a first temperature signal indicative of a temperature level of the exhaust gases exiting the diesel oxidation catalyst, the first temperature sensor operably communicating with the controller;
   a second temperature sensor disposed downstream of the SCR catalyst generating a second temperature signal indicative of a temperature level of the exhaust gases exiting the SCR catalyst, the second temperature sensor operably communicating with the controller; and
   the controller further configured to induce the diesel engine to stop combusting the rich air/fuel mixture in the at least one cylinder based on the first and second temperature signals.

5. The exhaust gas aftertreatment system of claim 1, further comprising a particulate filter coupled downstream of the SCR catalyst configured to capture particulate matter in the exhaust gases.

6. The exhaust gas aftertreatment system of claim 1, wherein the at least one cylinder comprises a plurality of cylinders of the diesel engine.

7. The exhaust gas aftertreatment system of claim 1, wherein the second time interval commences upon completion of the first time interval.

8. The exhaust gas aftertreatment system of claim 1, wherein the first time interval commences upon startup of the diesel engine.

9. A method for increasing a temperature of an SCR catalyst to reduce $NO_x$ in exhaust gases from a diesel engine utilizing an exhaust gas aftertreatment system, the system having a controller, a diesel oxidation catalyst, and the SCR catalyst, the diesel oxidation catalyst coupled downstream of the diesel engine, the SCR catalyst coupled downstream of the diesel oxidation catalyst, the method comprising:
   generating at least one control signal to induce the diesel engine to combust a lean air/fuel mixture during a first time interval so as to produce an output exhaust gas flow comprising a first concentration of a hydrocarbon (HC) and carbon monoxide (CO), and to combust a rich air/fuel mixture in at least one cylinder during a second time interval after the first time interval such that the output exhaust gas flow comprises a concentration of HC that is less than approximately about 1% greater than the first concentration of HC, utilizing the controller, wherein the controller is also configured to induce the diesel engine to combust the lean air/fuel mixture during a third time interval following the second time interval;

receiving the exhaust gases from the diesel engine in the diesel oxidation catalyst and oxidizing the CO to obtain an exothermic reaction in the diesel oxidation catalyst which increases a temperature of the exhaust gases flowing through the diesel oxidation catalyst to greater than a threshold temperature level; and receiving the exhaust gases greater than the threshold temperature level in the SCR catalyst and reducing $NO_x$ in the exhaust gases utilizing the SCR catalyst.

10. The method of claim 9, wherein generating the at least one control signal to induce the diesel engine to combust the rich air/fuel mixture in at least one cylinder comprises:

generating first and second control signals to inject two pilot fueling pulses into the at least one cylinder;

generating a third control signal to inject a primary fueling pulse into the at least one cylinder when an engine crankshaft is at a top dead center position; and generating a fourth control signal to inject a post fueling pulse into the at least one cylinder.

11. The method of claim 9, wherein the threshold temperature level is 300° C.

12. The method of claim 9, further comprising:

generating a first temperature signal indicative of a temperature level of the exhaust gases exiting the diesel oxidation catalyst, utilizing a first temperature sensor disposed between the diesel oxidation catalyst and the SCR catalyst, the first temperature sensor operably communicating with the controller;

generating a second temperature signal indicative of a temperature level of the exhaust gases exiting the SCR catalyst, utilizing a second temperature sensor disposed downstream of the SCR catalyst, the second temperature sensor operably communicating with the controller; and inducing the diesel engine to stop combusting the rich air/fuel mixture in the at least one cylinder based on the first and second temperature signals, utilizing the controller.

13. The method of claim 9, wherein the first time interval commences upon startup of the diesel engine.

14. The method of claim 9, wherein the first time internal has a duration of approximately about 70 seconds.

15. The method of claim 9, wherein the first time interval continues until a temperature of exhaust gas exiting the DOC is at least about 70 degrees C.

16. The method of claim 9, wherein the first time interval continues until a temperature of exhaust gas exiting the DOC is at least about 80 degrees C.

17. The method of claim 9, wherein the second time interval has a duration of approximately about 55 seconds.

18. The method of claim 9, wherein the second time interval continues until a DOC exit temperature is at least about 340 degrees C.

19. The method of claim 9, wherein the second time interval continues until a temperature level of exhaust gas entering the SCR catalyst is at least approximately about 200 deg C.

20. The method of claim 9, wherein, the second time interval continues until a temperature level of exhaust gas entering the SCR catalyst reaches a temperature at which reduction of NOx in the SCR catalyst occurs.

\* \* \* \* \*